United States Patent [19]

Chabanne

[11] Patent Number: 5,685,614
[45] Date of Patent: Nov. 11, 1997

[54] VEHICLE SEAT STRUCTURE INCORPORATING A SEAT BELT

[75] Inventor: Jean-Pierre Chabanne, Champvallon, France

[73] Assignee: Irausa Ingeniera S.A., Burgos, Spain

[21] Appl. No.: 666,073

[22] Filed: Jun. 19, 1996

[30] Foreign Application Priority Data

Jun. 20, 1995 [FR] France ................. 95 07744

[51] Int. Cl.$^6$ ................................................. B60N 2/42
[52] U.S. Cl. ................................. 297/452.2; 403/279
[58] Field of Search ..................... 297/452.18, 452.2, 297/483; 403/242, 274, 279, 281

[56] References Cited

U.S. PATENT DOCUMENTS

| | | | |
|---|---|---|---|
| 2,958,127 | 11/1960 | Johnson | 403/281 X |
| 4,597,687 | 7/1986 | Colas | 403/242 |
| 5,412,860 | 5/1995 | Miyauchi et al. | 297/452.2 X |
| 5,501,509 | 3/1996 | Urrutia | 297/452.2 X |

FOREIGN PATENT DOCUMENTS

| | | |
|---|---|---|
| 0646493 | 4/1995 | European Pat. Off. . |
| 3229857 | 2/1984 | Germany . |
| 4330011 | 3/1995 | Germany . |

*Primary Examiner*—Peter R. Brown
*Attorney, Agent, or Firm*—Oliff & Berridge

[57] ABSTRACT

A seat in which the backrest armature is composed of two uprights which, joined together by at least one crosspiece, are joined to the seat part armature by a fixed or articulated connection.

The upright of the backrest armature secured to the guide ring for the strap of the seat belt consists of a section piece extruded in lightweight metal alloy, composed of a tubular body reinforced by latero-posterior longitudinal box sections, this tubular body receiving, in its region for fixing to a crosspiece, and by inter-fitting, an insert with a transverse bore which coincides with transverse bores formed in this upright, whereas each of the ends of the crosspiece passing through one or other of the uprights and the corresponding insert is connected to this upright in terms of translation by its end being knocked over against the outer face of the upright and by a circular ridge formed on it being pressed against the inner face of this upright, and is connected in terms of rotation by radial deformations forming notches and penetrating the corresponding insert.

4 Claims, 3 Drawing Sheets

VEHICLE SEAT STRUCTURE INCORPORATING A SEAT BELT

BACKGROUND OF THE INVENTION

The invention relates to a vehicle seat structure incorporating a seat belt.

It relates more specifically to seats in which the diagonal strap of the seat belt coming from a winder passes through a guide ring fixed to one of the uprights of the backrest armature, while the lap strap and the locking tongue are fixed to the seat part armature.

In the event of an accident, and in general, in the event of abrupt deceleration, the seat structure is subjected, via the seat belt fastening points, to high forces which may, for example, be greater than 1000 deca newtons at the top of the backrest upright carrying the guide ring for the diagonal strap of the belt. Because there is a connection between the backrest armature and the seat part armature, these forces are transmitted first of all to the seat part armature and then to the points where it is anchored to the floor.

It is therefore important for this structure to be capable of withstanding these forces in order to ensure the safety of the passenger. Now, despite the care taken with the welds connecting these current structural members, it is not possible to guarantee their quality and this is increasingly true as the mass-production rates and the quest for lower manufacturing costs do not allow each weld to be inspected carefully, for example, by X-ray or ultrasound.

Another drawback in current seat structures arises from the fact that they are made exclusively from steel members, such as plate or tubes which, having constant thicknesses designed to withstand the highest forces locally, are too strong and too thick in the regions which are subject to lesser stresses and therefore make the construction needlessly heavy.

SUMMARY OF THE INVENTION

The object of the present invention is to overcome these drawbacks by providing a seat structure which combines members made of various materials assembled reliably and makes it possible to obtain the desired strength and weight reduction.

To this end, in the seat structure according to the invention, at least the upright of the backrest armature secured to the strap guide ring consists of a section piece extruded in lightweight metal alloy, composed of a tubular body reinforced by latero-posterior longitudinal box sections, this tubular body receiving, in its region for fixing to a crosspiece, and by interfitting, an insert with a transverse bore which coincides with transverse bores formed in this upright, whereas each of the ends of the crosspiece passing through one or other of the uprights and the corresponding insert is connected to this upright in terms of translation by its end being knocked over against the outer face of the upright and by a circular ridge formed on it being pressed against the inner face, and is connected in terms of rotation by radial deformations forming notches and penetrating the corresponding insert.

With this method of construction, assembly between the members of the backrest armature, and particularly the members withstanding the highest forces in the event of abrupt deceleration, is achieved by mechanical means leading to reliable connections which require merely a geometric inspection of the members, that is to say an inspection which can easily and cheaply be incorporated into a mass-production process.

What is more, this method of assembly makes it possible to join materials of different types, such as ferrous alloys and aluminum alloys, and thus plays a part in reducing the weight.

Finally, the use of a reinforced extruded section piece for making the upright subject to the highest stresses makes it possible, by machining, to remove material from regions where it is not required, giving this section piece a shape of equal strength.

In one embodiment of the invention, the lower end of each of the uprights of the backrest armature is fixed by a mechanical connection, of the screw or rivet type, on the one hand, to a lower mounting plate which is vertical and made in ferrous alloy and constitutes the main member of the seat part armature and also supports means for fixing to the floor and, on the other hand, a molded outer casing made of lightweight alloy.

This method of assembly has the advantage of transferring the forces perceived by the backrest armature and the reaction forces stemming from the fixing to the floor to members which are made of steel and are therefore very strong and of enshrouding the whole thing with a casing molded in a lightweight alloy, with thicknesses designed to suit the localized forces, it being possible for this casing to have forms, impressions or cavities depending on the requirements for the overall appearance and each vehicle manufacturer's identifying elements.

It would seem that the saving in weight is combined with a reduction in manufacturing cost by eliminating the synthetic substance trim elements currently employed to identify each vehicle manufacturer.

Other features and advantages will become clear from the description which follows with reference to the attached diagrammatic drawing which represents, by way of example, one embodiment of the structure according to the invention in the case of its application to a fixed backrest seat.

In this drawing, the general references A and B denote, respectively, the backrest armature and the seat part armature. The backrest armature A is itself composed of two uprights, 2 and 3 respectively, joined together by at least one crosspiece 4.

Figure 1:
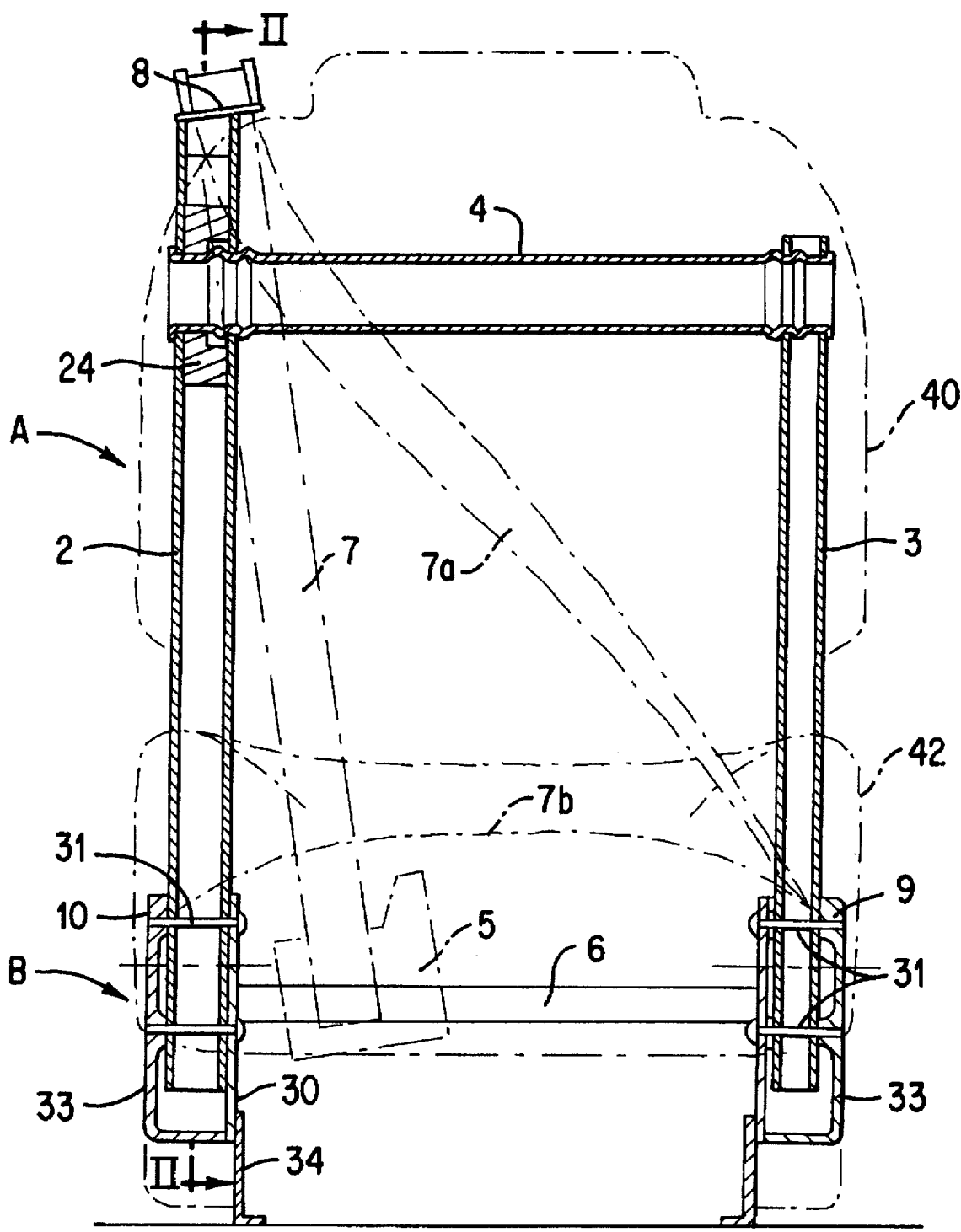
FIG. 1 is a vertical transverse section through the backrest armature in its region where it joins the seat part armature.

In FIG. 1, the numerical reference 5 represents the winder of a seat belt fixed to a spacer piece 6 of the seat part armature B and from which a strap 7 passing through a guide ring 8 fixed to the upper end of the upright 2 is paid out. The diagonal strap 7a of the strap 7 runs from the guide ring 8 as far as the locking tongue 9, which fastens into a case, not represented, arranged on one side of the seat part armature B. The lap strap 7b runs from the buckle of the locking tongue 9 as far as a fastening region 10 arranged on the other side of the seat part armature B.

DESCRIPTION OF THE PREFERRED EMBODIMENT(S)

Figure 4:
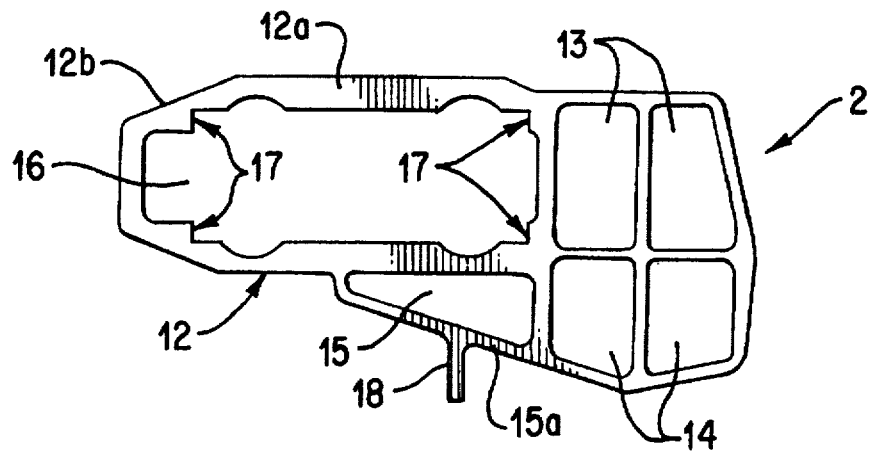
FIG. 4 is an end-on view of one embodiment of the section piece constituting the stressed upright of the backrest armature.

According to the invention, at least the upright 2 carrying the guide ring 8 consists of a section piece extruded in lightweight alloy, and especially in aluminum alloy. In the embodiment represented in FIG. 4, this section piece is composed of a tubular main body 12 extended on one side by two posterior box sections 13 juxtaposed with box sections 14 which protrude laterally on one side of the tubular body 12. A lateral box section 15 attaches the protruding box sections 14 to the flank of the tubular body 12. The latter has, in transverse section, a rectangular external shape 12a with a trapezoidal anterior end 12b. Internally, it includes a housing 16 of rectangular overall shape delimited by four longitudinal slots 17 of L-shaped section.

This section piece is intended to be arranged with its lateral box section 15 and its protruding box sections 14 turned to the inside of the backrest armature. It will be noted that the wall 15a of the lateral box section 15 is equipped with a longitudinal ridge 18 projecting outward and constituting a component for fastening the members for supporting the backrest.

Figures 2, 3:
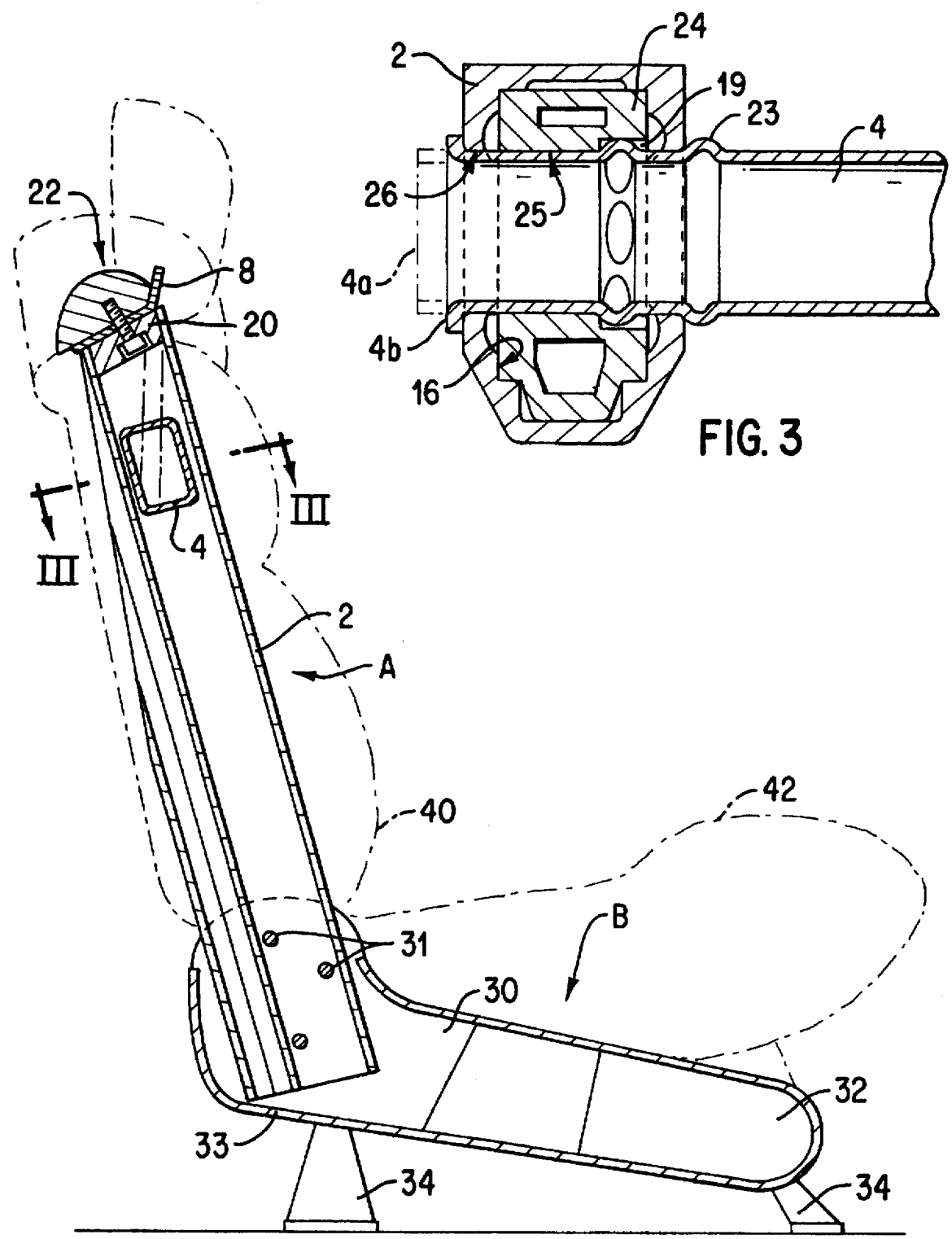
FIG. 2 is a side view in transverse section on II—II of FIG. 1.
FIG. 3 is a view in section on III—III of FIG. 2 showing, on an enlarged scale, the connection between the crosspiece and the section piece upright of the backrest armature.

As shown in FIG. 2, in the upper end of the upright 2 there is fitted a tenon 20 secured to an assembly 22 carrying the guide ring 8.

The upright 3 can be made in a section piece identical to that of the upright 2, but it may also, as represented here, be made in a tubular section piece of rectangular cross section and in ferrous alloy, of the type of those used normally to construct backrest armatures.

The crosspiece 4 is made in a ferrous alloy and has a transverse section which is rectangular in the embodiment represented, but which may also be circular. Close to each of its ends it includes a circular external ridge 23 intended to play a part in connecting it, in terms of longitudinal translation, to the corresponding upright 2 or 3. This connection employs, as shown in FIGS. 1 and 3, an insert 24 made of metal or synthetic substance, which is forcibly fitted into the housing 16 of the section piece 2 until the through housing 25 which it includes coincides with the through housing 26 formed in the lateral walls of the section piece 2. At this stage, the tubular part of the corresponding end of the crosspiece 4 protruding beyond the ridge 23 is engaged in the housings 26 and 25 until said ridge comes into contact with the corresponding wall of the section piece 2. In a subsequent phase, and as shown in FIG. 3, the end of the crosspiece which protrudes beyond the body 2 (represented in chain line) at 4a is folded back by knocking over against said wall, as represented at 4b. In these conditions, the longitudinal connection of the crosspiece and the section piece 2 of the upright in terms of translation is perfectly ensured in one direction, by the knocked-over part 4b and, in the other direction, by the ridge 23. The immobilization in terms of translation and the connection in terms of rotation are finished off by forming, in that part of the crosspiece arranged inside the insert 24, radial deformations 28 which project outward and penetrate an apppropriate groove 29 of the insert 24.

The same technique is employed to provide the connection between the other end of the crosspiece and the upright 3.

This technique makes it possible to obtain a connection which is uniform and reliable over time and limits the inspection to simple checks on the dimensions and geometry of the assembled members.

Another advantage of this connection is that it makes it possible to join components made in different materials and that it thus makes it possible to assemble steel components with aluminum alloy and/or magnesium alloy components.

Figure 5:
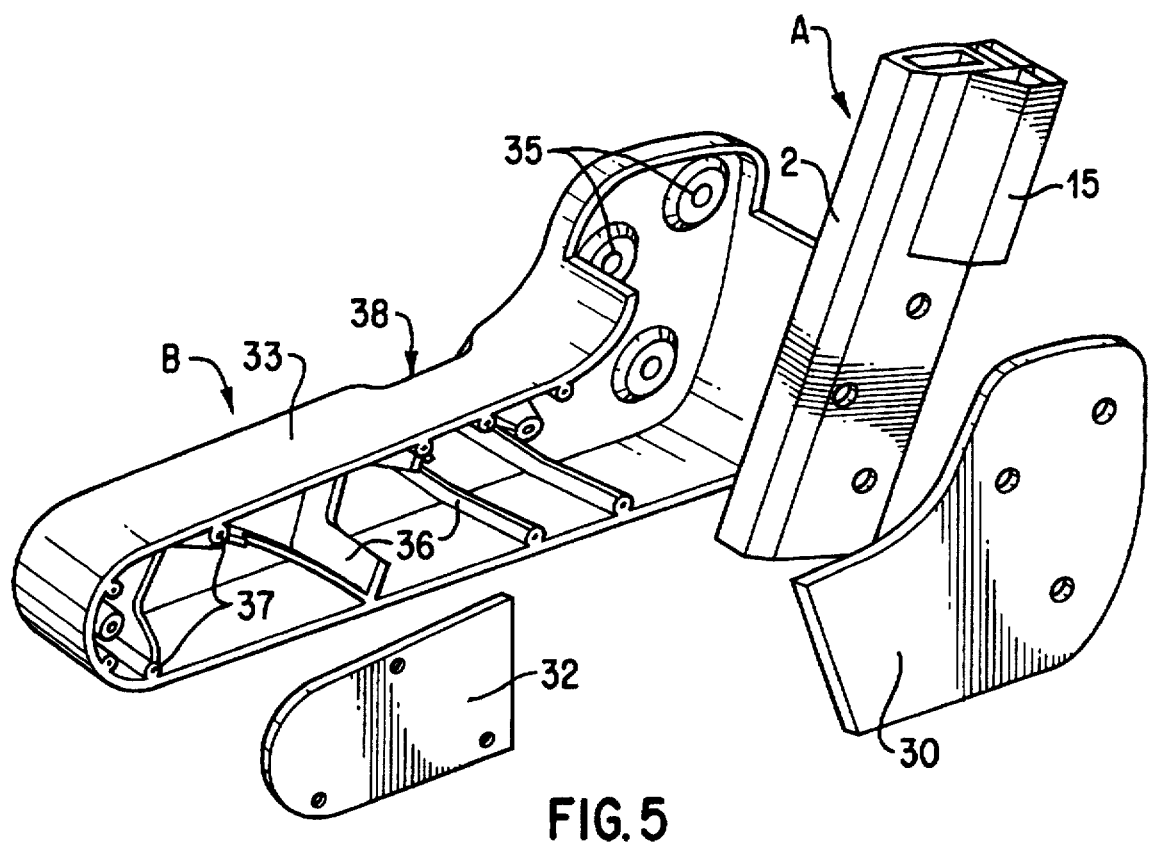
FIG. 5 is a part view in exploded perspective showing the constituent parts of the seat part armature.

In the embodiment represented, and as shown in FIG. 5, the seat part armature consists, on each side, of a main and rear mounting plate 30, of a secondary and front mounting plate 32 and of a casing 33, these various members being joined to the members arranged on the other side by crosspieces of the type represented at 6 in FIG. 1. The mounting plates 30 and 32 are made in ferrous alloy, for example, consist of steel sheet with sufficient thickness to withstand the static and dynamic forces acting upon them. Each of these mounting plates carries the members for fixing to the floor, represented as 34 in FIG. 1, the members for supporting the seat part, and the various controls for actuating the means for fixing to the floor or for articulating the backrest, when the latter is articulated. The mounting plate 30 also provides the connection with the backrest armature A and in doing so plays a part in transmitting the forces perceived by this backrest armature to the seat part armature B.

In the embodiment represented in FIG. 5, the lower end of the upright 2, the lateral box section 15 of which is machined by milling in order to reduce the thickness of this upright, is connected to the mounting plate 30 by transverse screws 34 passing through the mounting plate, right through this upright end and screwed into bosses 35 of the casing 33. This casing is made in aluminum alloy and/or magnesium alloy, and by molding, which makes it possible for its thickness to change as a function of the stresses exerted on it, and makes it possible for it to be given locally reinforcing ridges 36 and wells 37 for fixing the mounting plate 30 and the mounting plate 32 by self-tapping screws, not represented.

Because of its shape as a ridged open case, each of the lateral casings 33 of the seat part armature is strong enough to transmit the forces from the mounting plate 30 to the mounting plate 32, while being more lightweight than a conventional steel tube structure. What is more, depending on the whims of the vehicle manufacturers, it allows the overall appearance of the seat to be altered, giving it various forms. It also makes it possible to obtain the manufacturers' identification logos by molding, thus avoiding having to resort to small plates of synthetic substance bonded or clipped to the structure of the seat part armature.

Each of the casings 33 includes, in its outer lateral part, a depression 38 reinforced by the ridges 36 and used for the fixing of the means for fastening the buckle or the case for the locking tongue of the lap strap.

FIG. 2 shows that in order to contribute to lightening the seat overall, without in any way thereby reducing its strength, the upright 2 is machined by milling, especially in its region 39 including the posterior lateral box sections 13 and 14, and this is done over more than half of its height starting from its upper end.

It is obvious that the two armatures, namely the backrest armature A and seat part armature B, respectively, which have just been described, subsequent to assembly receive the members for hanging and fixing the backrest covering 40, represented in FIG. 1, and the seat part covering 42, respectively.

It is clear from the foregoing that the seat structure according to the invention makes it possible not only to dispense with welded connections which cannot economically be inspected during mass production, but also, using manufacturing and assembly techniques which are simple, reliable, and easy to inspect, to obtain assemblies between different materials, this making it possible, for the same strength, to reduce the overall weight of the structure. What is more, the use of molded members for enshrouding the mechanical components and transmitting forces gives the designer great freedom to alter the overall lines of the seat, depending on the wishes of his customers.

I claim:

1. Vehicle seat structure incorporating a seat belt in which a diagonal strap of the seat belt coming from a winder passes through a strap guide ring fixed to an upright of a backrest armature, while a lap strap and a locking tongue are fixed to a seat part armature, in which structure the backrest armature is composed of two uprights which, joined together by at least one crosspiece are joined to the seat part armature by a fixed or articulated connection, wherein at least the upright of the backrest armature secured to the strap guide ring consists of a section piece extruded in lightweight metal alloy, composed of a tubular body reinforced by structural members that create latero-posterior longitudinal box sections, this tubular body receiving, in its region for fixing to a crosspiece, and by inter-fitting, an insert with a transverse bore which coincides with transverse bores formed in this upright, whereas each of the ends of the crosspiece passing through one or other of the uprights and the corresponding insert is connected to this upright in terms of translation by its end being folded back against the outer face of the upright and by a circular ridge formed on it being pressed against the inner face of this upright, and is connected in terms of rotation by radial deformations forming notches and penetrating the corresponding insert.

2. The seat structure as claimed in claim 1, wherein starting from the upper end of the extruded section piece forming the upright, and over more than half of the height of this upright, the width of this upright increases from a value corresponding to the width of the tubular body up to a value corresponding to the maximum width of the section piece, by milling the latero-posterior box sections.

3. The seat structure as claimed in claim 1, wherein the lower end of each of the uprights of the backrest armature is fixed by a mechanical connection, of the screw or rivet type, to a lower mounting plate which is vertical and made in ferrous alloy and constitutes the main member of the seat part armature and also supports means for fixing to the floor and, an outer casing made by molding of lightweight alloy.

4. The structure as claimed in claim 3, wherein the anterior end of each of the outer casings of the seat part armature is fixed, by a mechanical connection of the screw or rivet type, to a front lower mounting plate which forms part of the seat part armature and supports means for fixing to the floor.

* * * * *